(12) United States Patent
Stoner et al.

(10) Patent No.: US 9,449,424 B2
(45) Date of Patent: Sep. 20, 2016

(54) VISUALIZATION OF FIELD OF VIEW OBSTRUCTION BY AN ELLIPSOID

(71) Applicant: ANALYTICAL GRAPHICS INC., Exton, PA (US)

(72) Inventors: Frank Todd Stoner, Chester Springs, PA (US); Patrick John Cozzi, Drexel Hill, PA (US)

(73) Assignee: ANALYTICAL GRAPHICS INC., Exton, PA (US)

( * ) Notice: Subject to any disclaimer, the term of this patent is extended or adjusted under 35 U.S.C. 154(b) by 127 days.

(21) Appl. No.: 14/475,920

(22) Filed: Sep. 3, 2014

(65) Prior Publication Data

US 2015/0070353 A1 Mar. 12, 2015

Related U.S. Application Data

(60) Provisional application No. 61/877,013, filed on Sep. 12, 2013.

(51) Int. Cl.
*G06T 17/00* (2006.01)
*G06T 15/06* (2011.01)

(52) U.S. Cl.
CPC ..................................... *G06T 15/06* (2013.01)

(58) Field of Classification Search
None
See application file for complete search history.

(56) References Cited

U.S. PATENT DOCUMENTS

| 2011/0169830 A1* | 7/2011 | D'Amora | G06T 15/06 345/424 |
| 2012/0182297 A1* | 7/2012 | Hanniel | G06T 17/10 345/421 |
| 2013/0328875 A1* | 12/2013 | Burley | G06T 15/50 345/426 |

* cited by examiner

*Primary Examiner* — Peter Hoang
(74) *Attorney, Agent, or Firm* — The Marbury Law Group, PLLC

(57) ABSTRACT

Methods, systems, and devices for the visualization of the region of a 3-dimensional space obstructed from a viewing location by an ellipsoid are disclosed. In an embodiment, the obstructed region may be defined from primitive elements which are combined using Boolean operations. The primitive elements chosen may be represented using both implicit functions and/or parametric surfaces. In an embodiment, the implicit function representation may be used to quickly determine points on candidate surfaces which may be obstructed from view. In an embodiment, the parametric representation may be used to provide ray-surface intersection solutions enabling visualization of the boundary surface of the obstruction region.

15 Claims, 12 Drawing Sheets

VISUALIZATION OF FIELD OF VIEW OBSTRUCTION BY AN ELLIPSOID

CROSS REFERENCE TO RELATED APPLICATIONS

This application claims the benefit of priority to U.S. Provisional Application No. 61/877,013 filed Sep. 12, 2013 entitled "Visualization of Field of View Obstruction by an Ellipsoid," the entire contents of which are hereby incorporated by reference.

FIELD

The present invention relates generally to the creation of imagery for visualization of a region of obstruction and more particularly to the creation of computer generated imagery for visualization of the region of obstruction created by an ellipsoidal shape, such as found in the rendering of virtual globes.

BACKGROUND

Rendering of geographic information in 3-dimensions requires efficient techniques for determining what graphical elements contribute to the scene and should be included in the visualization. Moreover, this determination must be performed repeatedly during the process of animation when the graphical elements are dynamic and their characteristics and geometric relationships change between animation frames.

Of particular interest in such visualizations is the depiction of the region of obstruction from a particular viewing location created by an ellipsoidal object such as the Earth, Moon, or other celestial body. Visualization of this region of obstruction is of importance since it serves to indicate limitations on what can be observed from a particular vantage point.

Also of interest is the restriction of a defined view volume, such as the field of view of a sensor, due to the ellipsoidal obstruction, since it allows visualization of the limitations imposed on the volume by the obstructing body.

SUMMARY

The systems, methods, and devices of the various embodiments enable the visualization of the region of a 3-dimensional space obstructed from a viewing location by an ellipsoid. In an embodiment, the obstructed region may be defined from primitive elements which are combined using Boolean operations. The primitive elements chosen may be represented using both implicit functions and/or parametric surfaces. In an embodiment, the implicit function representation may be used to quickly determine points on candidate surfaces which may be obstructed from view. In an embodiment, the parametric representation may be used to provide ray-surface intersection solutions enabling visualization of the boundary surface of the obstruction region.

An embodiment method may enable visualizing the region of obstruction created by an ellipsoidal solid with respect to a particular viewing location. A further embodiment method may enable visualizing the portion or portions of the region of obstruction created by an ellipsoidal solid which restricts a defined view volume. A still further embodiment method may enable visualizing the effect of the region of obstruction created by an ellipsoidal solid on the boundary surface of a defined view volume.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
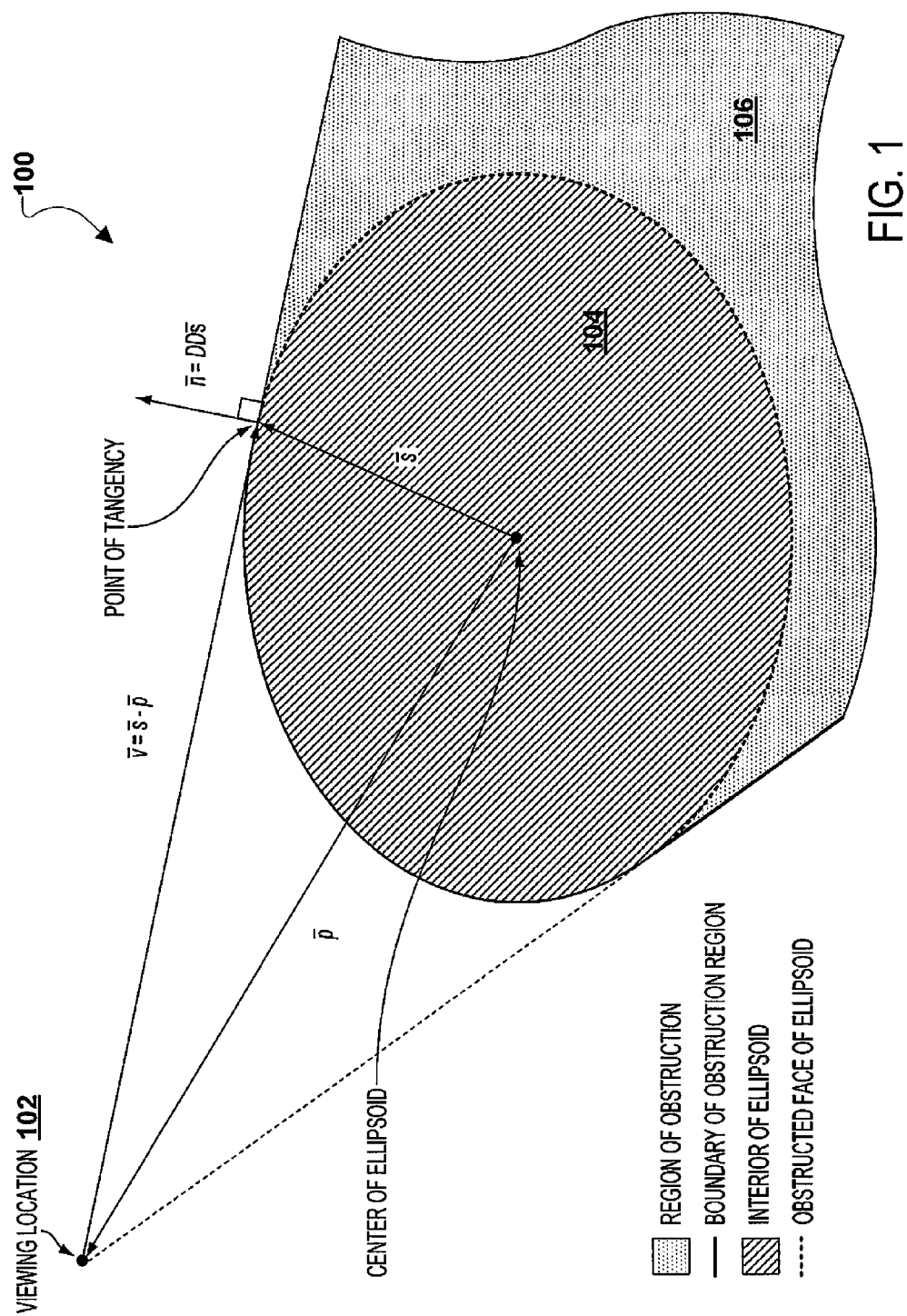
FIG. 1 illustrates geometric relationships and mathematical elements in a native problem space of an obstructing ellipsoid.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, "sensor" encompasses a component or components of a detection device that senses electromagnetic radiation for subsequent processing.

The systems, methods, and devices of the various embodiments enable the visualization of the region of a 3-dimensional space obstructed from a viewing location by an ellipsoid. In an embodiment, the obstructed region may be defined from primitive elements which are combined using Boolean operations. The primitive elements chosen may be represented using both implicit functions and/or parametric surfaces. In an embodiment, the implicit function representation may be used to quickly determine points on candidate surfaces which may be obstructed from view. In an embodiment, the parametric representation may be used to provide ray-surface intersection solutions enabling visualization of the boundary surface of the obstruction region.

An embodiment method may enable visualizing the region of obstruction created by an ellipsoidal solid with respect to a particular viewing location. A further embodiment method may enable visualizing the portion or portions of the region of obstruction created by an ellipsoidal solid which restricts a defined view volume. A still further embodiment method may enable visualizing the effect of the region of obstruction created by an ellipsoidal solid on the boundary surface of a defined view volume.

The standard equation of an ellipsoid centered at the origin with semi-axes lengths a, b, c is defined by Equation (1) as:

$$\left(\frac{x}{a}\right)^2 + \left(\frac{y}{b}\right)^2 + \left(\frac{z}{c}\right)^2 = 1 \quad (1)$$

Equation (1) may be represented in matrix form as Equation (2) as follows:

$$\bar{s}^T D^T D \bar{s} = 1 \quad (2)$$

where $\bar{s}$ is the vector from the center of the ellipsoid to a point on the surface and D is the diagonal matrix formed from the inverses of the semi-axes lengths as illustrated below.

$$\bar{s} = \begin{bmatrix} x \\ y \\ z \end{bmatrix}, D = \begin{bmatrix} \frac{1}{a} & 0 & 0 \\ 0 & \frac{1}{b} & 0 \\ 0 & 0 & \frac{1}{c} \end{bmatrix}$$

A vector $\bar{n}$ normal to the surface of the ellipsoid at $\bar{s}$ can be found by taking the gradient of Equation (2) as shown in Equation (3).

$$\bar{n} = 2D^T D \bar{s} \quad (3)$$

The surface points which form the extent of the visible "face" of the ellipsoid from some viewing location $\bar{p}$ will satisfy the tangency condition defined in Equation (4):

$$\bar{v} \cdot \bar{n} = 0 \quad (4)$$

where $\bar{v}$ is the vector from the viewing location $\bar{p}$ to the surface point $\bar{s}$ resulting in $\bar{v}$ equaling $\bar{p}$ minus $\bar{s}$ as defined in Equation (5).

$$\bar{v} = \bar{p} - \bar{s} \quad (5)$$

FIG. 1 illustrates the geometric relationships of the viewing location 102, the ellipsoid 104, and the region of obstruction 106 discussed above in a 2-dimensional cross section 100.

Representing equation (4) in matrix form and incorporating Equations (3) and (5) produces the relationship illustrated in Equation (6).

$$2(\bar{p}-\bar{s})^T D^T D \bar{s} = 0 \quad (6)$$

Since the surface points must satisfy Equation (2), Equation (6) can be simplified resulting in Equation (7).

$$\bar{p}^T D^T D \bar{s} = 1 \quad (7)$$

The matrix D constitutes a simple scaling operation which converts the original problem involving an ellipsoid into an equivalent problem where the ellipsoid has been transformed to a sphere of unit radius. Accordingly, applying the following substitutions illustrated in Equations (8), (9), and (10):

$$\hat{r} = D\bar{s} \quad (8)$$

$$\bar{q} = D\bar{p} \quad (9)$$

$$\bar{w} = D\bar{v} \quad (10)$$

Equations (2), (6), and (7) are equivalently represented in Equations (11), (12), and (13), respectively, as:

$$\hat{r}^T \hat{r} = 1 \quad (11)$$

$$2\bar{w}^T \hat{r} = 0 \quad (12)$$

$$\bar{q}^T \hat{r} = 1 \quad (13)$$

Equation (11) demonstrates that the surface points of the ellipsoid lie on the surface of the transformed unit sphere. Equation (12) illustrates that the tangency condition between $\bar{v}$ and $\bar{n}$ converts to a tangency condition between the transformed vectors $\bar{w}$ and $\hat{r}$. These points of tangency on the unit sphere, together with the point p, define a cone region whose boundary is tangent to the unit sphere. Most significantly, Equation (13) indicates that the surface points which form the extent of the visible "face" of the ellipsoid from some viewing location $\bar{p}$ have a constant projection onto the unit vector along $\bar{q}$ in the transformed space of the unit sphere. Specifically, this projection is given by the relationship illustrated in Equation (14).

$$\hat{q}^T \hat{r} = \frac{1}{q} \quad (14)$$

Figure 2:
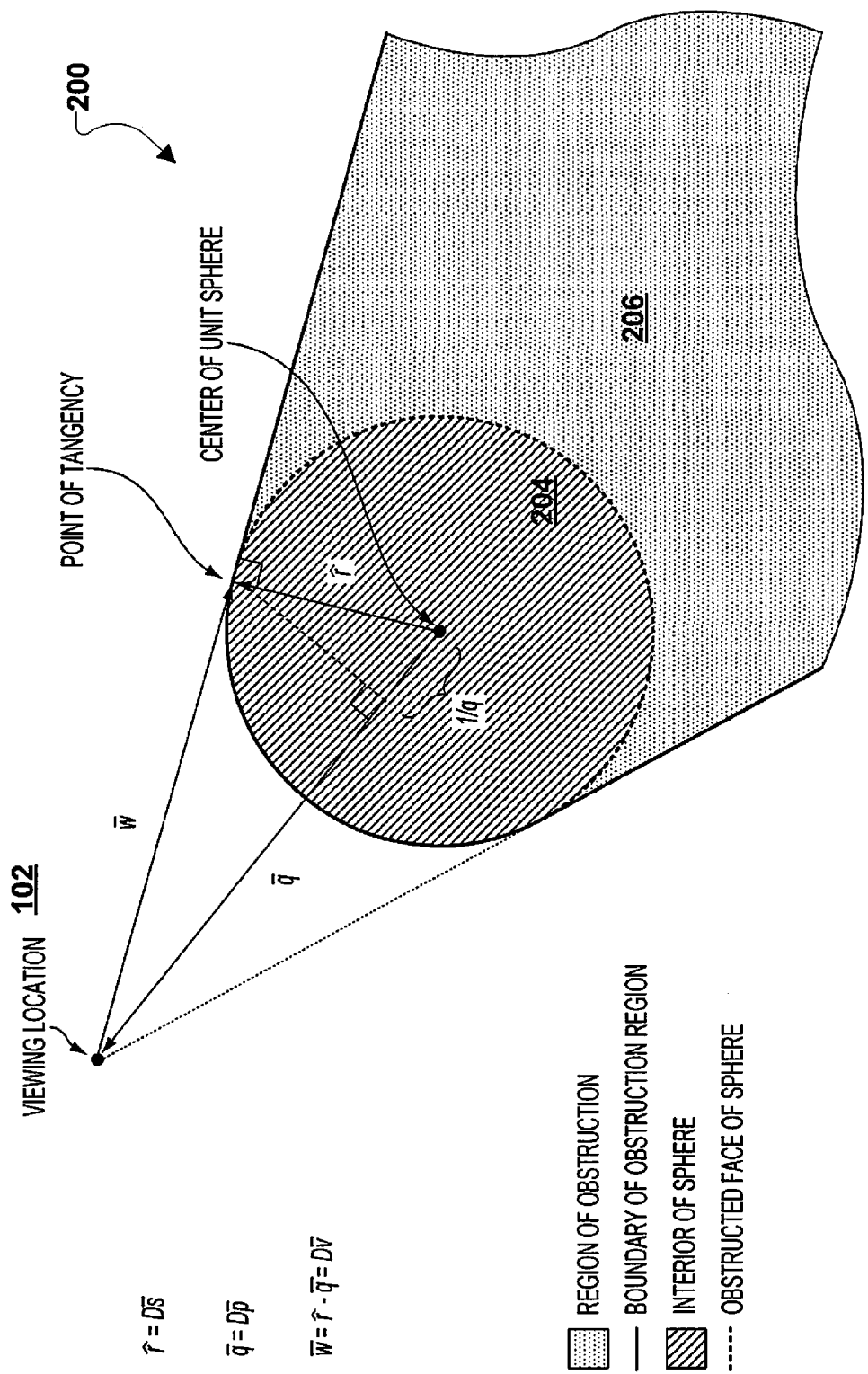
FIG. 2 illustrates geometric relationships and mathematical elements in a scaled problem space where an obstructing ellipsoid has been transformed to a unit sphere.

FIG. 2 depicts the transformed relationships in a 2-dimensional cross section 200. Note that the region of the original (untransformed) space 106 (illustrated in FIG. 1) that is obstructed from view by the ellipsoid 104 has a corresponding region 206 in the transformed space where the obstruction is the unit sphere 204.

In an embodiment, equation (14) may be interpreted as a condition that the solution points $\hat{r}$ lie in a plane that is a distance 1/q along $\hat{q}$. This condition can be expressed as Equation (15):

$$\hat{q}^T \left(\hat{r} - \frac{1}{q}\hat{q}\right) = 0 \quad (15)$$

from which equation (14) may be easily recovered. This plane is taken to be the boundary surface of a half-space region.

Figure 3:
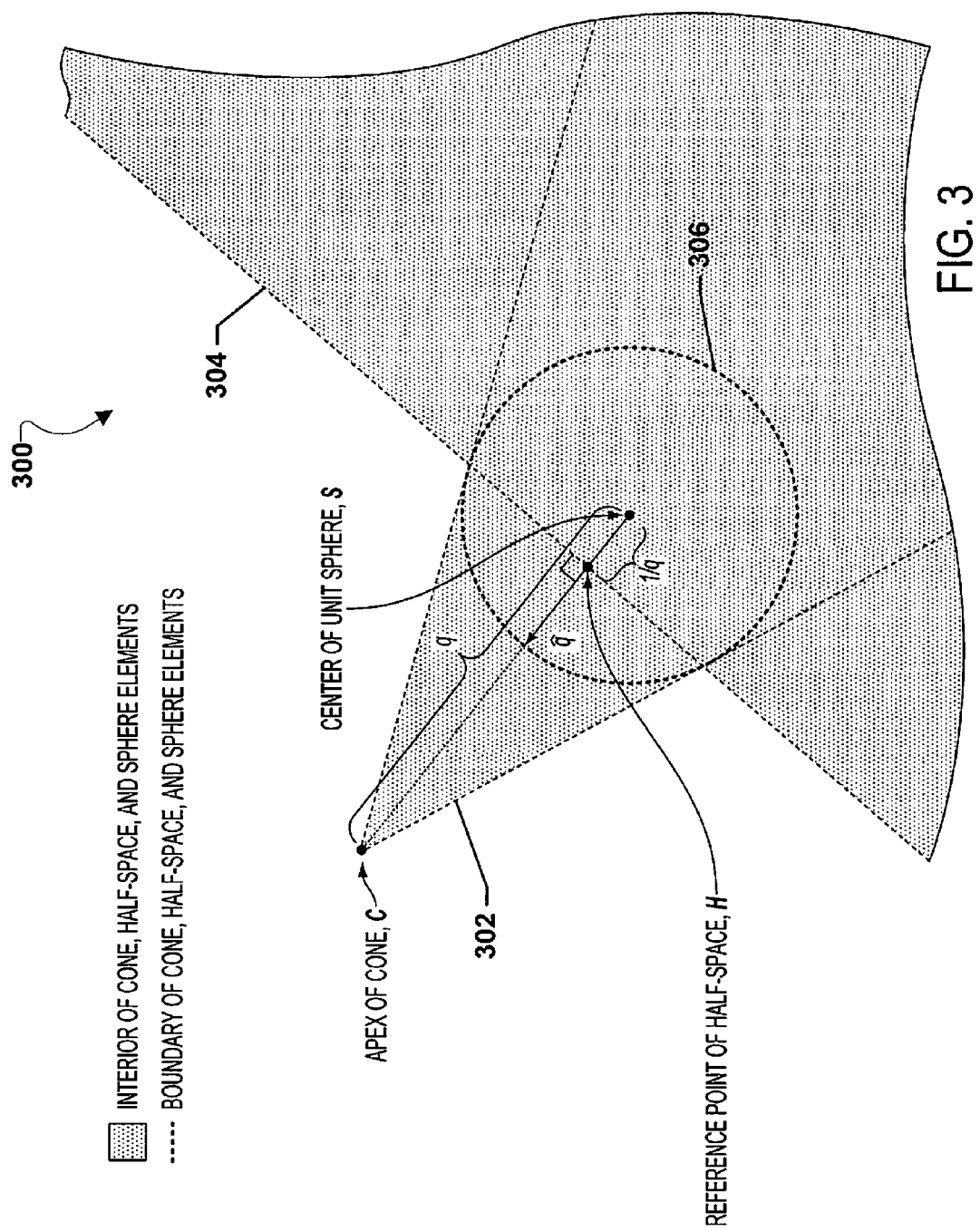
FIG. 3 illustrates boundaries and interiors of primitive elements that comprise a region of obstruction in a scaled problem space.
Figure 4:
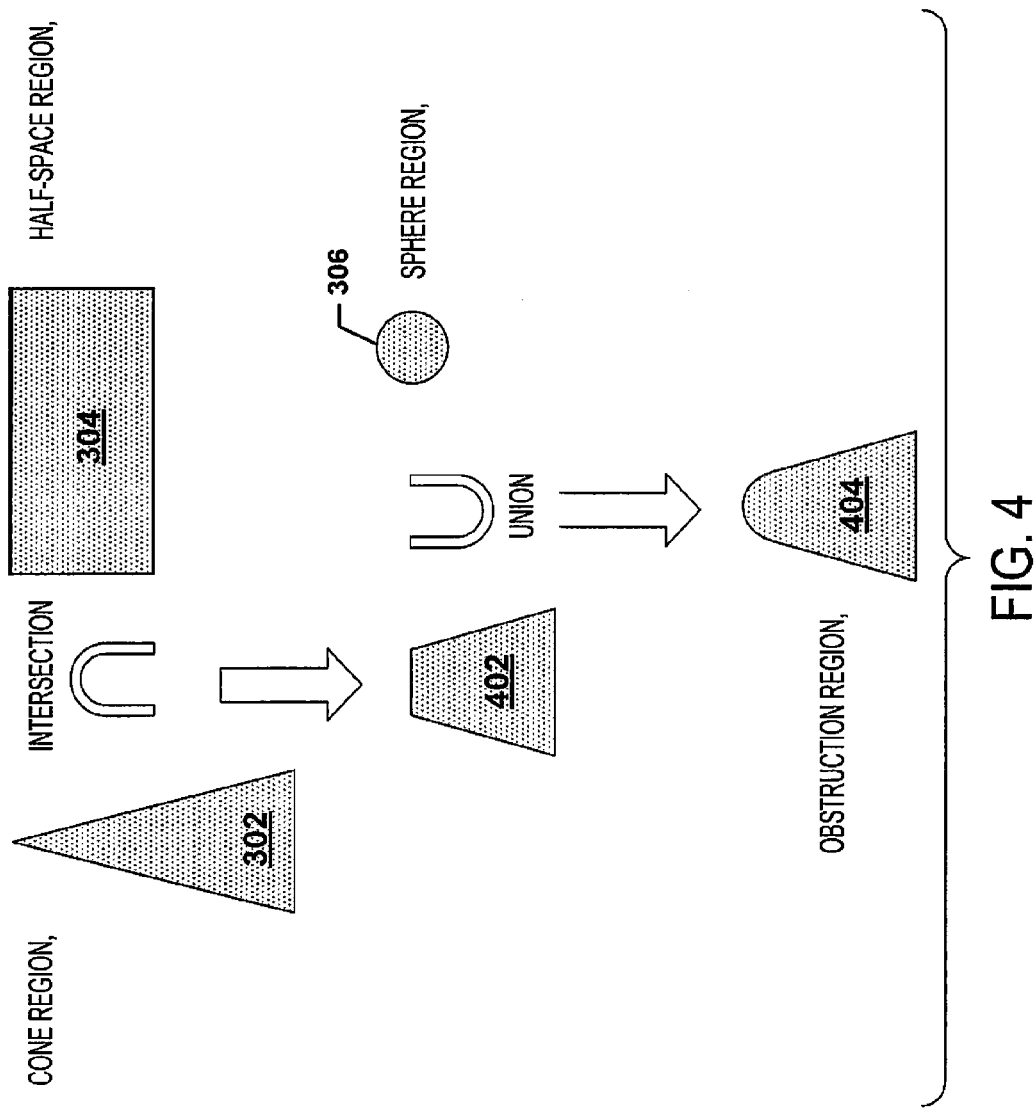
FIG. 4 illustrates regions and Boolean operations that define a region of obstruction in a scaled problem space.

In an embodiment, the region of obstruction may be defined by combining the region of the unit sphere, the tangent cone, and the half-space using Boolean operations, intersection "∩" and union "∪". FIG. 3 illustrates the geometry of the three regions (i.e., the cone region 302, half-space region 304, and sphere region 306) in a 2-dimensional cross section 300. FIG. 4 illustrates that the Boolean expression of the intersection 402 of the cone region 302 and the half-space region 304 unioned with the sphere region 306 results in the obstruction region 404.

In an embodiment, the procedure for visualizing the region of obstruction begins by defining the bounding volume which encloses the region of obstruction to be considered. In the strict sense, this bounding volume may not fully enclose the region of obstruction (since the region of obstruction is infinite in an extent). It is sufficient to limit the bounding volume based on the extents of the view frustum. The bounding volume serves as a proxy for the region of obstruction and is used to determine the pixels to be tested as part of a ray-casting operation discussed below with reference to embodiment method 500 illustrated in FIG. 5.

Figure 5:
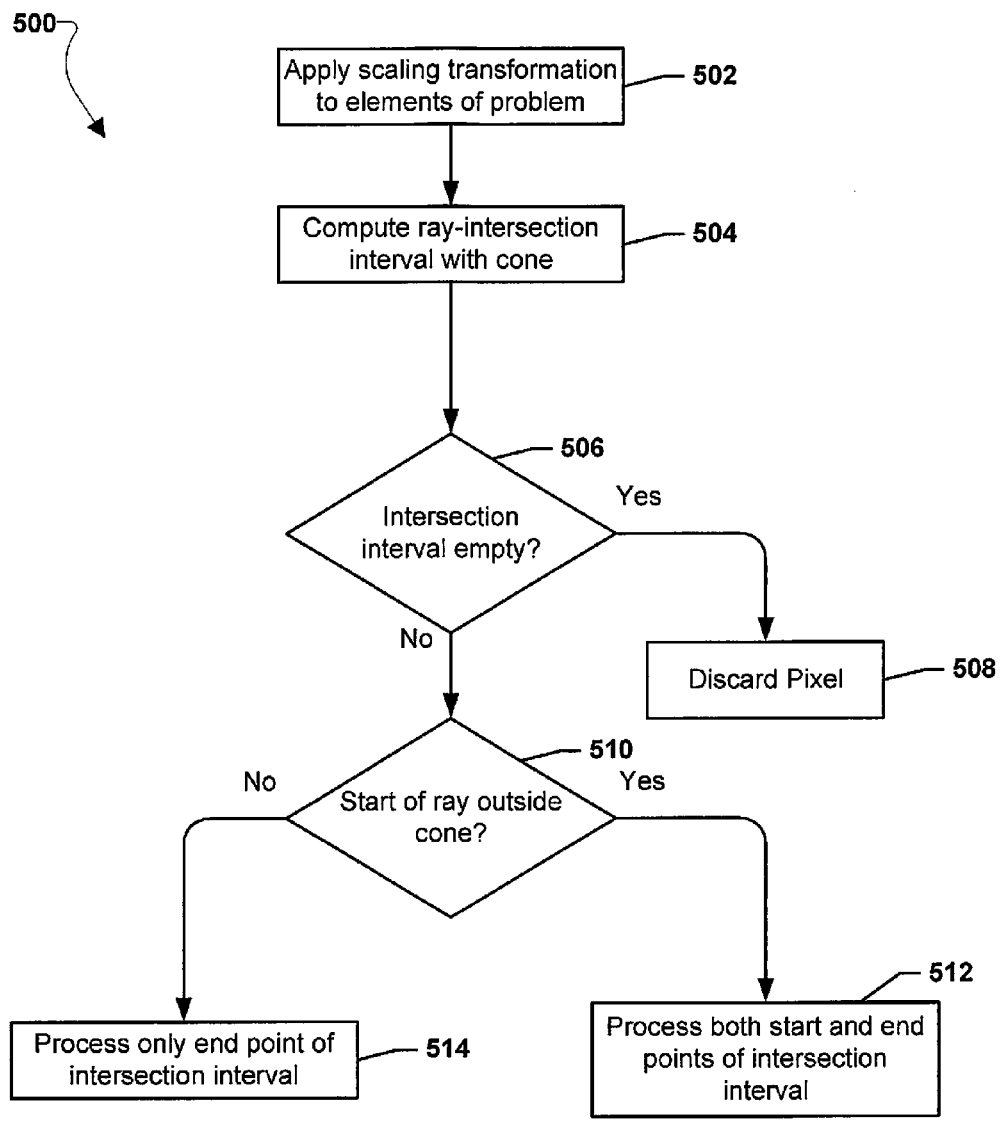
FIG. 5 is a process flow diagram illustrating an embodiment method for determining the pixels to be tested as part of a ray-casting operation.
Figure 11:
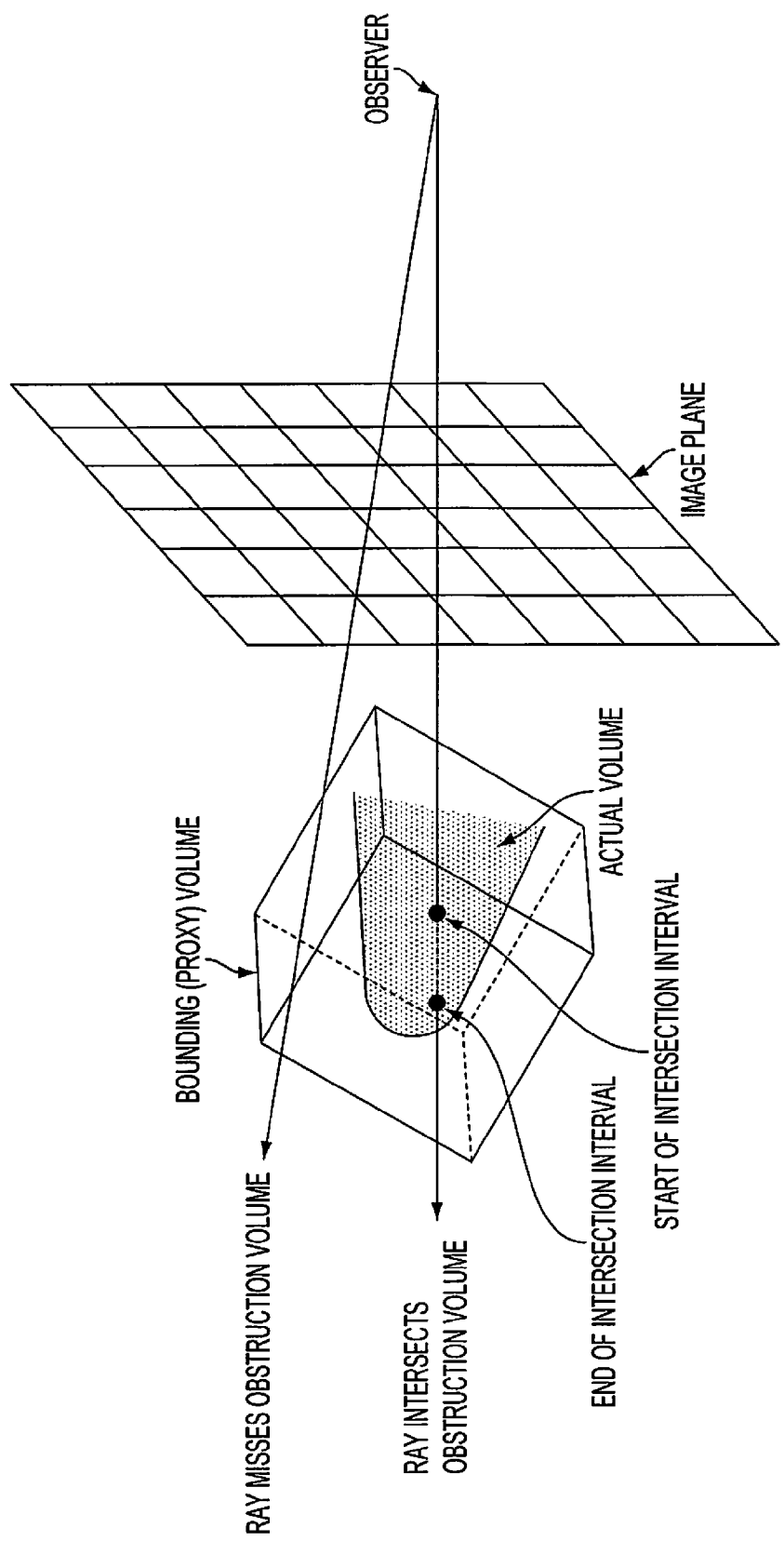
FIG. 11 illustrates ray-casting elements in relation to an image plane for an obstruction volume.

FIG. 5 illustrates an embodiment method 500 for determining the pixels to be tested as part of a ray-casting operation. In an embodiment, the operations of method 500 may be performed by a processor of a computing device. Method 500 may begin in block 502 by applying the scaling transformation to the elements of the problem including the viewing location (typically the sensor vertex location) and the origin and direction of the ray. In block 504 the ray-intersection interval with the cone may be computed. Some rays will intersect the region of obstruction and some will not (as illustrated in FIG. 11 described below). In determination block 506 the processor may determine (e.g., check) whether the intersection interval is empty. In response to determining that the ray does not intersect the region of obstruction and the intersection interval is empty (i.e., determination block 506="Yes"), in block 508 the pixel that does not intersect the region may be discarded (e.g., not shaded in a generated display or image). In response to determining that the ray does intersect the region of obstruction and the intersection interval is not empty (i.e., determination block 506="No"), the pixel that does intersect the region is further processed. In determination block 510 the processor may determine (e.g., check) whether the start of the ray is outside the cone. In response to determining that the start of the ray is outside the cone (i.e., determination block 510="Yes"), in block 512 both the start and the end of the ray must be processed, for example processed according to the operations of method 600 discussed below with reference to FIG. 6 or method 700 discussed below with reference to FIG. 7. Otherwise (i.e., determination block 510="No"), only the end point of the ray must be processed for example processed according to the operations of method 600 discussed below with reference to FIG. 6 or method 700 discussed below with reference to FIG. 7. The operations of method 500 may be performed continuously to process each ray originating from a viewing location and the processing of each ray may be data-parallel, so that each ray is treated independently and concurrently to generate a display or image of the region of obstruction.

Figure 6:
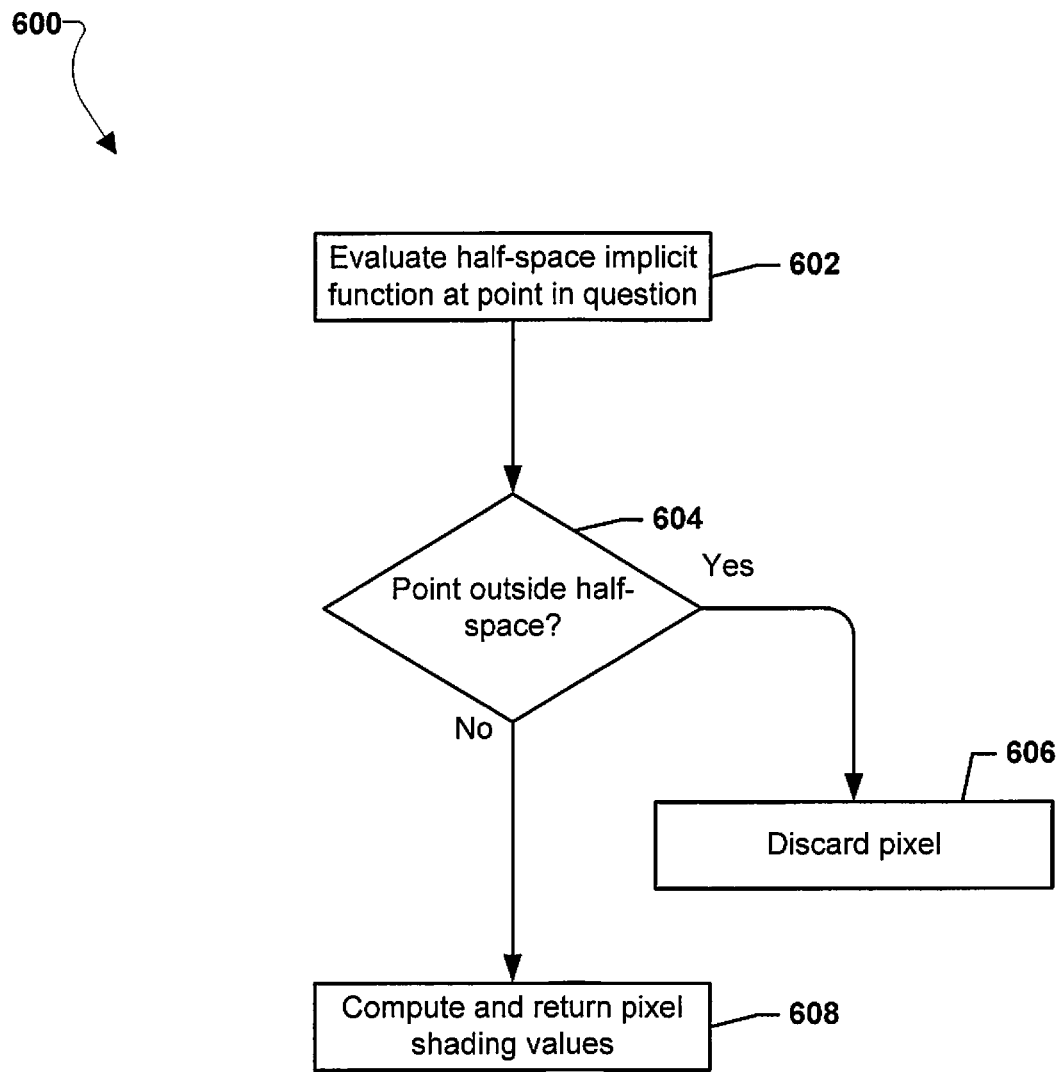
FIG. 6 is a process flow diagram illustrating an embodiment method for visualizing the region of obstruction.

FIG. 6 illustrates an embodiment method 600 for visualizing the region of obstruction. In an embodiment, the operations of method 600 may be performed in conjunction with the operations of method 500 described above with reference to FIG. 5. In an embodiment, the operations of method 600 may be performed by a processor of a computing device. In block 602 the processor may evaluate the implicit function representation of the half-space region at the point or points in question (e.g., the end point and possibly the start point of intersection interval as determined by the operations of method 500 described above). In determination block 604 the processor may determine whether the point or points are outside the half-space region. In response to determining that the point or points in question are outside the half-space region (i.e., determination block 604="Yes"), in block 606 the pixel is discarded (e.g., not shaded in a generated display or image). Otherwise (i.e., determination block 604="No"), appropriate shading and depth values are computed for the point in question. The operations of method 600 may be performed continuously and the processing of each ray may be data-parallel, so that each ray may be treated independently and concurrently. As an example, such processing may be done by rendering the bounding volume with front-face culling using a graphics API, and then implementing ray processing in the fragment shader. In this manner, a display or image of the region of obstruction may be generated and output by the processor.

Figure 7:
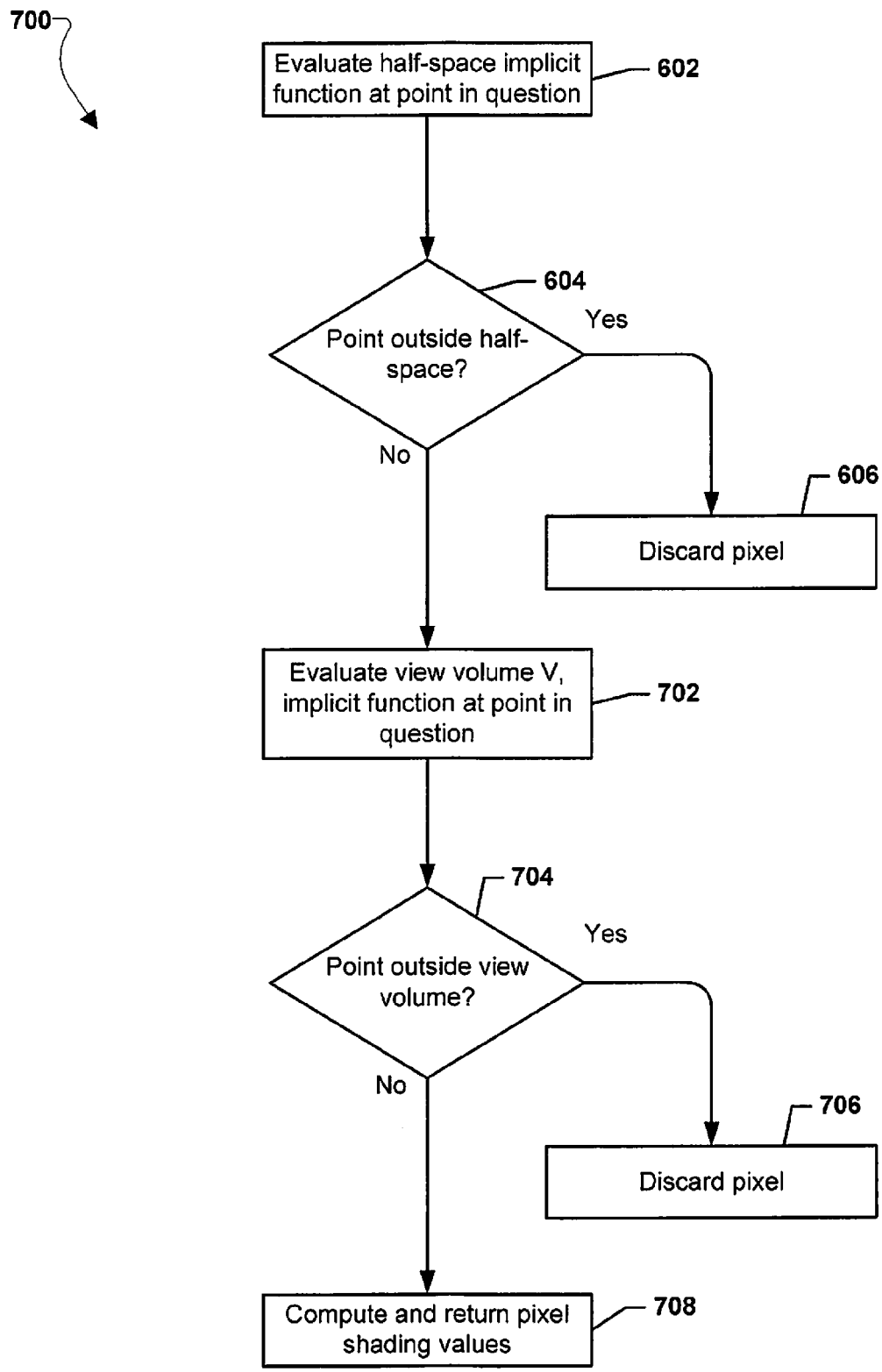
FIG. 7 is a process flow diagram illustrating an embodiment method for visualizing the portion or portions of the region of obstruction that may restrict a defined view volume.

FIG. 7 illustrates an embodiment method 700 for visualizing the portion or portions of the region of obstruction that may restrict a defined view volume. In an embodiment, the operations of method 700 may be performed in conjunction with the operations of method 500 described above with reference to FIG. 5. In an embodiment, the operations of method 700 may be performed by a processor of a computing device. The procedure for visualizing the portion or portions of the region of obstruction which restricts a defined view volume begins by defining the bounding volume of the defined view volume. The bounding volume may be polygonal volume like a box, pyramid, or k-DOP (i.e., a discrete oriented polytope formed by k planes), or the bounding volume may be a polygonal representation of an implicit surface such as sphere. The bounding volume may serve as a proxy for the defined view volume and may be used to determine the pixels to be tested as part of a ray-casting operation, for example the operations of method 500 described above with reference to FIG. 5.

As discussed above, in block 602, 604, and 606, the operations of like numbered blocks of method 600 described above with reference to FIG. 6 may be performed to evaluate the half-space region implicit function at the point or points in question and determine whether the point or points are outside the half-space region. In response to determining that the point is inside the half-space region (i.e., determination block 604="Yes"), in block 702 the processor may evaluate the view volume V using the implicit function representing the defined view volume at the point or points in question. In determination block 704 the processor may determine whether the point or points are outside the view volume. In response to determining that the point or points in question are outside the view volume (i.e., determination block 704="Yes"), in block 706 the pixel is discarded (e.g., not shaded in a generated display or image). Otherwise (i.e., determination block 704="No"), in block 708 appropriate shading and depth values are computed for the point or points in question. As examples appropriate shading computations may include Lambert, Phong, Blinn-Phong, and translucency via compositing, though any shading technique may be used using the data generated by the various embodiments, such as intersection positions, normal, etc. As another example, given the intersection position in world coordinates and assuming a depth range of 0 to 1, the depth may be computed as vec4 v=model ViewPerspective Matrix*vec4(position, 1.0); v.z /=v.w; float depth=(v.z+1.0) *0.5. The operations of method 700 may be performed continuously and the processing of each ray may be data-parallel, so that each ray may be treated independently and concurrently. As an example, such processing may be done by rendering the bounding volume with front-face culling using a graphics API, and then implementing ray processing in the fragment shader. In this manner, a display or image of the region of obstruction may be generated and output by the processor.

Figure 8:
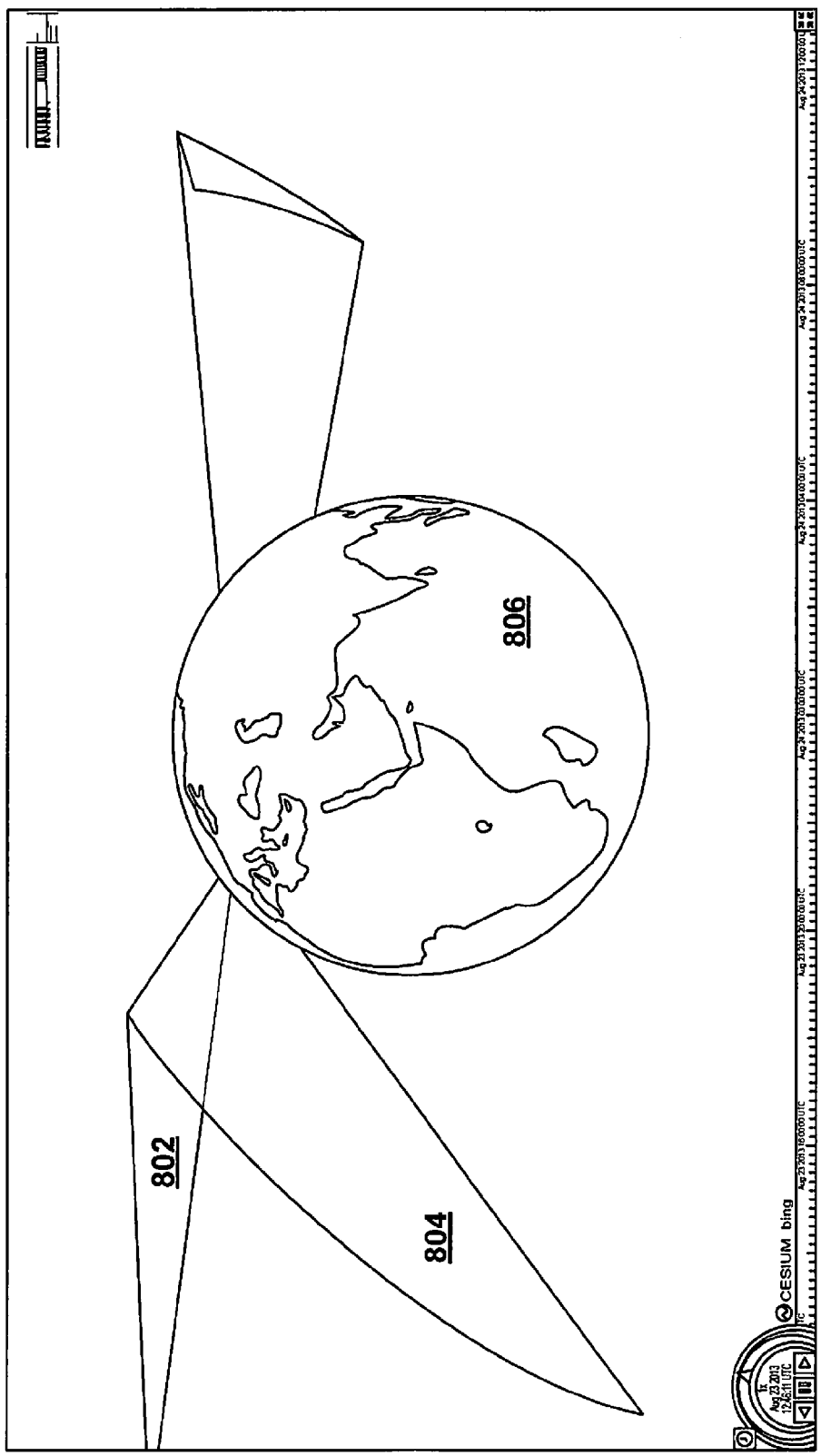
FIG. 8 is a screen shot showing a visualization of a boundary of a region obstructed by an ellipsoidal Earth where a view volume is a field of view of a rectangular sensor.

FIG. 8 is a screen shot illustrating an image or display (e.g., a web page) resulting from the processing of method 700 described above with reference to FIG. 7 where the defined view volume is a rectangular pyramid representing the field of view of a rectangular sensor. The camera for the scene illustrated in FIG. 8 is located inside the obstruction region. The portion of the boundary surface of the obstruction region 804 is illustrated along with the boundary of the rectangular sensor volume 802. The viewing location in FIG. 8 is behind the Earth 806 where the edges of the sensor volume would intersect.

Figure 9:
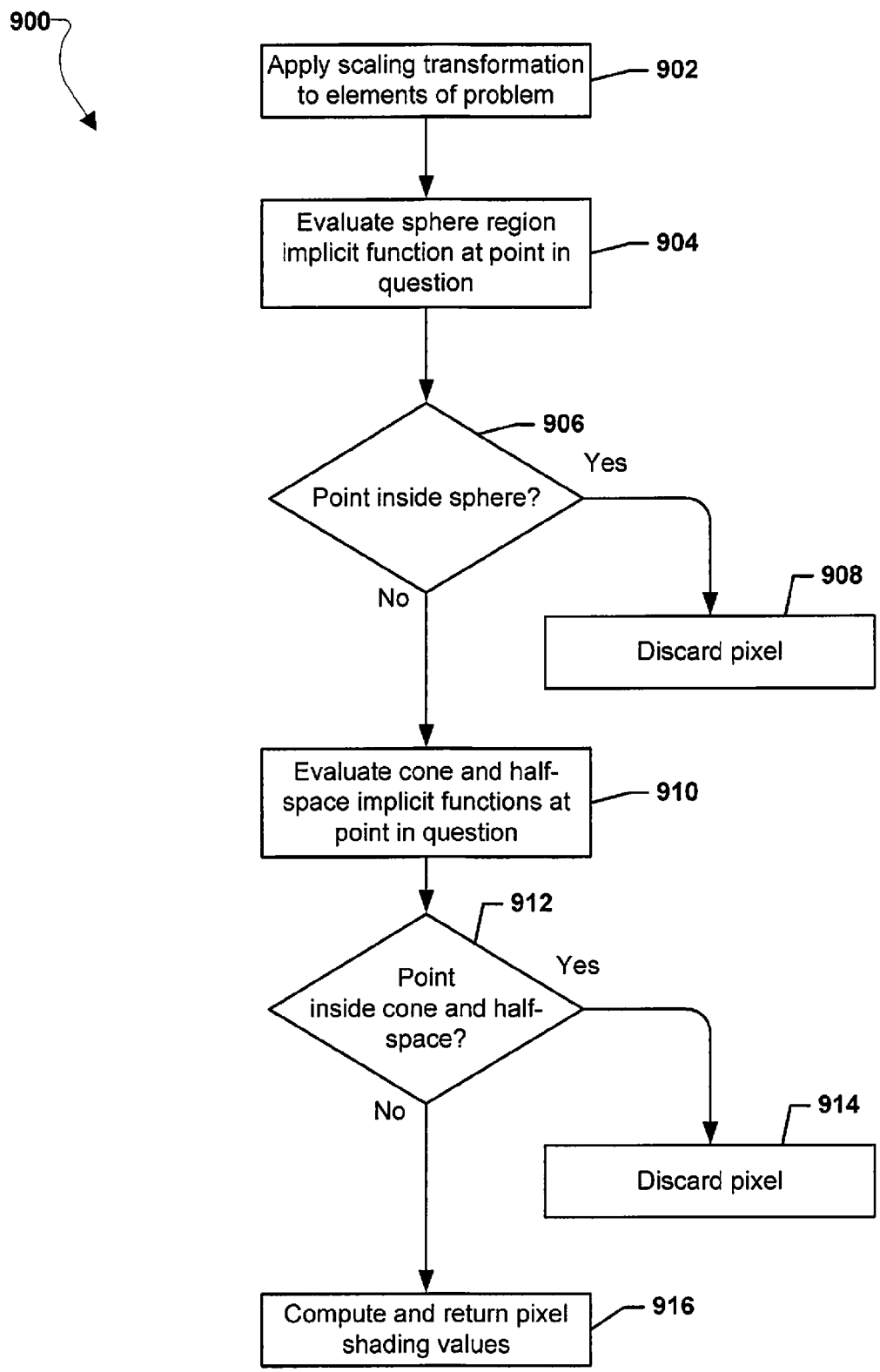
FIG. 9 is a process flow diagram illustrating an embodiment method for visualizing the effect of the region of obstruction created by an ellipsoidal solid on a boundary surface of a defined view volume.

FIG. 9 illustrates an embodiment method 900 for visualizing the effect of the region of obstruction created by an ellipsoidal solid on a boundary surface of a defined view volume. In an embodiment, the operations of method 900 may be performed by a processor of a computing device. The method 900 is invoked for each pixel of the boundary surface to be rendered. Method 900 may begin in block 902 by applying the scaling transformation to the elements of the problem. In block 904 the implicit function representation of the sphere region may be evaluated at the point or points in question. In determination block 906 the processor may check whether the point or points are inside the sphere. In response to determining that the point or points in question are inside the sphere (i.e., determination block 906="Yes"), in block 908 the pixel is discarded (e.g., not shaded in a generated display or image). Otherwise (i.e., determination block 906="No"), the point or points in question may be evaluated using the implicit function representations of the cone region and half-space region. In determination block 912 the processor may determine whether the point or points are inside the cone and half-space regions. In response to determining that the point or points in question are inside the cone region and inside the half-space region (i.e., determination block 912="Yes"), in block 914 the pixel may be discarded (e.g., not shaded in a generated display or image). Otherwise (i.e., determination block 912="No"), in block 916 appropriate shading and depth values may be computed for the point or points in question. The operations of method 900 may be performed continuously and the processing of each pixel may be data-parallel, so that each pixel may be treated independently and concurrently. As an example, the pixel location on the boundary surface of the defined view volume may be determined through normal graphics tessellation/rasterization processing or through ray-casting techniques. In this manner, a display or image of the region of obstruction may be generated and output by the processor.

Figure 10:
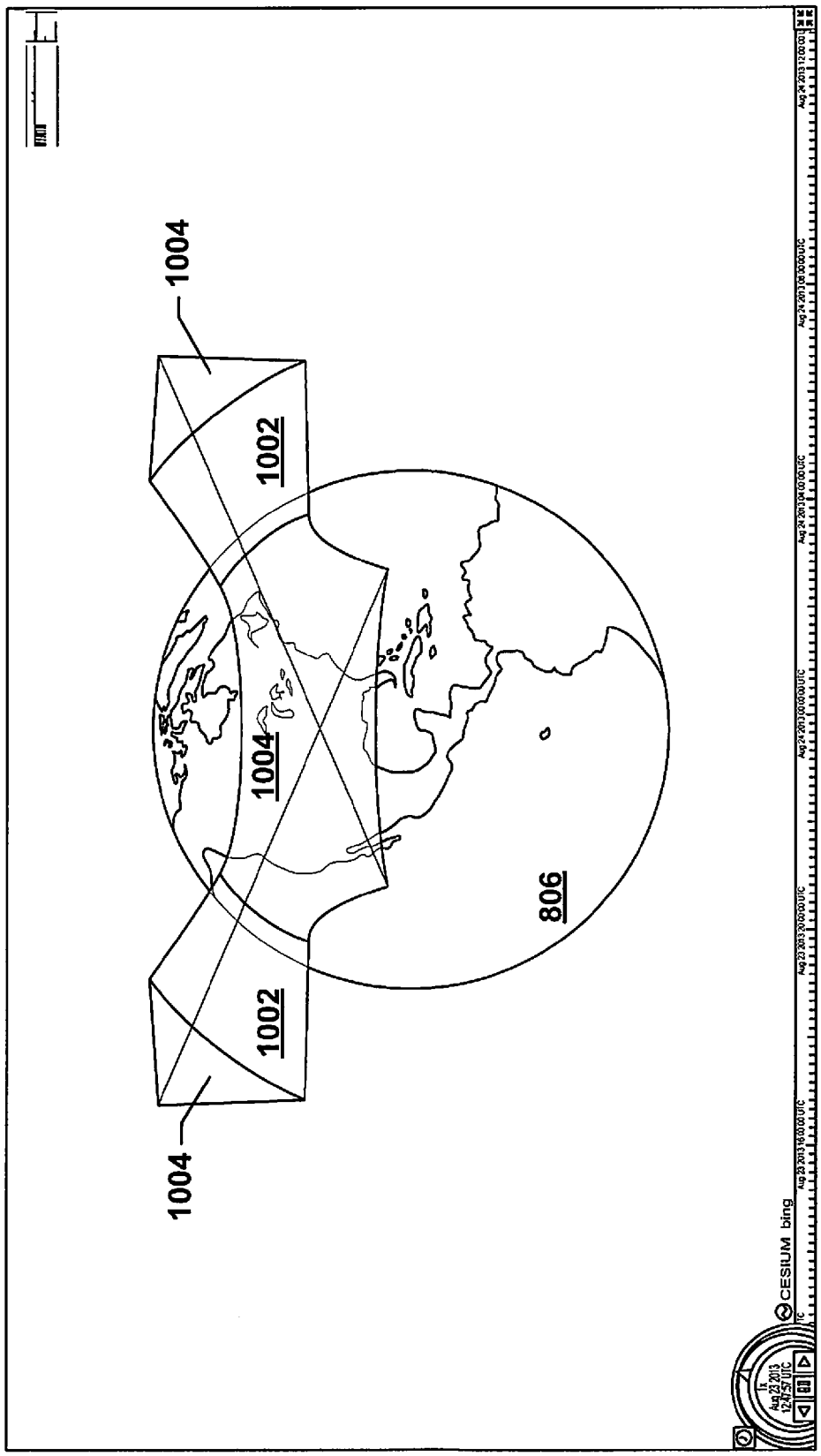
FIG. 10 is a screen shot showing a visualization of a boundary of a field of view of a rectangular sensor with obstruction by an ellipsoidal Earth.

FIG. 10 is a screen shot illustrating an image or display (e.g., web page) resulting from the processing of method 900 described above with reference to FIG. 9 described above where the defined view volume is a rectangular pyramid representing the field of view of a rectangular sensor. The portion of the boundary surface of the obstruction region 1002 is illustrated in FIG. 10 as well as the boundary of the rectangular sensor volume 1004. The viewing location in FIG. 10 is the sensor vertex, slightly higher than the center of the screen where all of the edges of the rectangular sensor appear to intersect. FIGS. 8 and 10 illustrate the same sensor projection geometry. FIG. 10 illustrates the camera behind the sensor projection looking at the intersection geometry, while FIG. 8 illustrates the camera inside the obstruction volume thereby almost rotating the view 180 degrees about the North Pole of the Earth 806 in FIG. 10.

FIG. 11 illustrates ray-casting elements in relation to an observer, image plane, bounding (proxy) volume, and an obstruction volume. As illustrated in FIG. 11, some rays will intersect the region of obstruction producing a non-empty ray intersection interval, and some rays will not intersect the region producing an empty ray intersection interval. FIG. 11 illustrates the 3-dimensional geometry of the rendering of the obstruction region as viewed from some observer. The shuttlecock-shaped region of obstruction (labeled "actual volume") in FIG. 11 illustrates the 3-dimensional view of the 2-dimensional cross section illustrated in FIGS. 1-4 (which do not account for the location of the observer (e.g., camera)). The region labeled "bounding (proxy) volume" encompasses the region of obstruction to be rendered.

Figure 12:
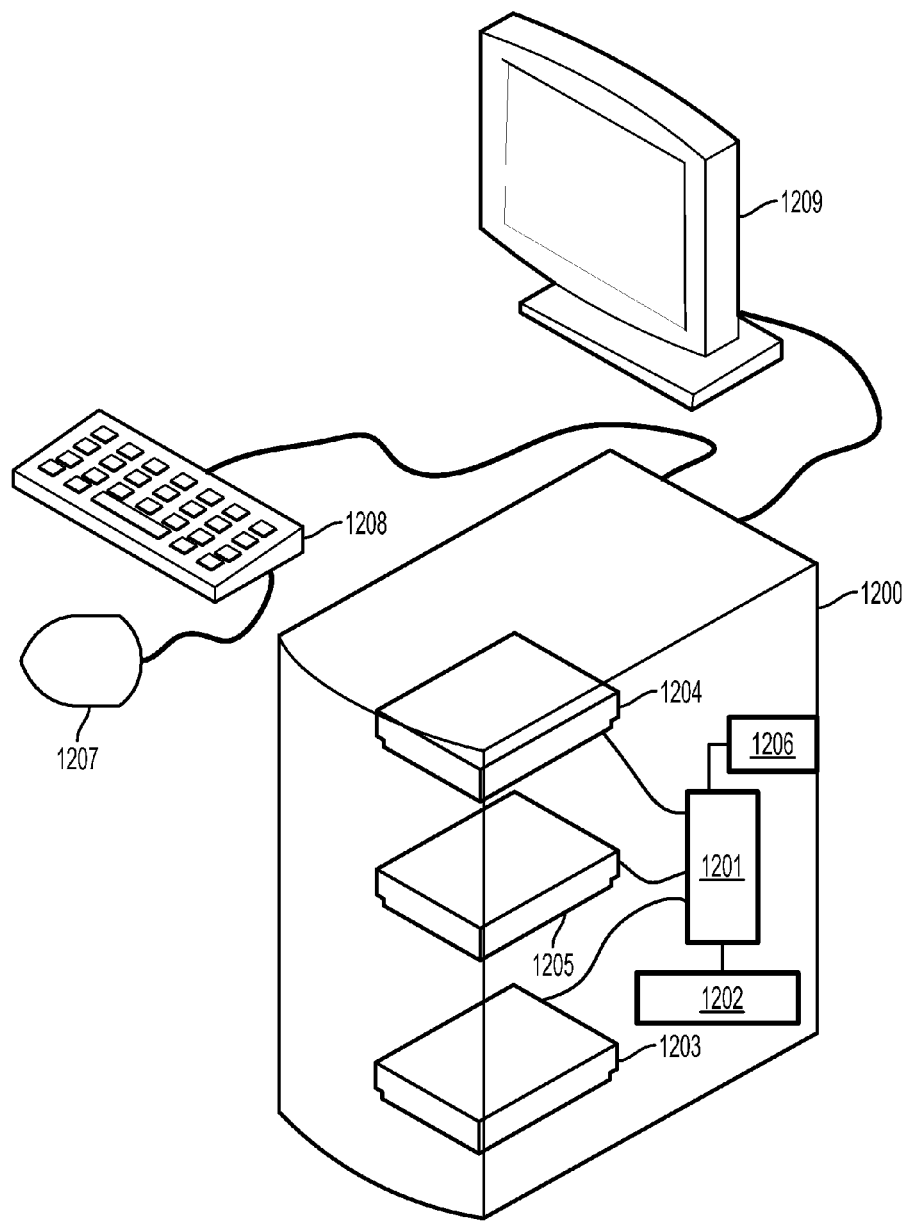
FIG. 12 is a component diagram of an example computer suitable for use with the various embodiments.

The various embodiments may be implemented in any of a variety of computing devices, an example of which is illustrated in FIG. 12. A computing device 1200 will typically include a processor 1201 coupled to volatile memory 1202 and a large capacity nonvolatile memory, such as a disk drive 1205 of Flash memory. The computing device 1200 may also include a floppy disc drive 1203 and a compact disc (CD) drive 1204 coupled to the processor 1204. The computing device 1200 may also include a number of connector ports 1206 coupled to the processor 1201 for establishing data connections or receiving external memory devices, such as a USB or FireWire® connector sockets, or other network connection circuits for coupling the processor 1201 to a network. The computing device 1200 may also include the trackball 1207, keyboard 1208 and display 1209 all coupled to the processor 1201.

The processor 1201 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processor 1201. The processor 1201 may include internal memory sufficient to store the application software instructions. In many devices the internal memory may be a volatile or nonvolatile memory, such as flash memory, or a mixture of both. For the purposes of this description, a general reference to memory refers to memory accessible by the processor 1201 including internal memory or removable memory plugged into the device and memory within the processor 1201 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), a graphics processing unit (GPU), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for visualizing a portion of a region of obstruction created by an ellipsoidal solid, comprising:
   applying, in a processor, a scaling transformation to elements of a data set defining a viewing location and the ellipsoidal solid to determine a cone region;
   computing, in the processor, a ray intersection interval with the cone region;
   determining, in the processor, whether the ray intersection interval intersects with the cone region;
   discarding, in the processor, pixels of the ray intersection interval that do not intersect with the cone region;
   applying, in the processor, appropriate shading and depth values to pixels of the ray intersection interval that do intersect with the cone region; and
   displaying the pixels having shading and depth values.

2. The method of claim 1, wherein applying, in the processor, appropriate shading and depth values to pixels of the ray intersection interval that do intersect with the cone region comprises:
   determining, in the processor, whether the start point of the ray is outside the cone region;
   applying, in the processor, appropriate shading and depth values to only pixels of an end point of the ray intersection interval in response to determining the start of the ray is not outside the cone region; and
   applying, in the processor, appropriate shading and depth values to both pixels of the start point and the end point of the ray intersection interval in response to determining the start of the ray is outside the cone region.

3. The method of claim 1, wherein applying, in the processor, appropriate shading and depth values to pixels of the ray intersection interval that do intersect with the cone region comprises:
   evaluating, in the processor, an implicit function of a half-space region at a point on the ray intersection interval;
   determining, in the processor, whether the point is outside the half-space region;
   discarding, in the processor, pixels of the ray intersection interval that are outside the half-space region; and
   computing and returning pixel shading values in the processor for the pixels of the ray intersection interval that are not outside the half-space region.

4. The method of claim 1, wherein applying appropriate shading and depth values to pixels of the ray intersection interval that do intersect with the cone region comprises:
   evaluating, in the processor, an implicit function of a half-space region at a point on the ray intersection interval;
   determining, in the processor, whether the point is outside the half-space region;
   discarding, in the processor, pixels of the ray intersection interval that are outside the half-space region;
   evaluating, in the processor, an implicit function of the view volume at the point in response to determining the point is not outside the half-space region;
   determining, in the processor, whether the point is outside the view volume;
   discarding, in the processor, pixels of the ray intersection interval that are outside the view volume; and
   computing and returning pixel shading values in the processor for the pixels of the ray intersection interval that are not outside the view volume.

5. A method for visualizing an effect of a region of obstruction created by an ellipsoidal solid on a defined view volume, comprising:
 applying, in a processor, a scaling transformation to elements of a data set defining a viewing location and the ellipsoidal solid to determine a sphere region;
 evaluating, in the processor, an implicit function of the sphere region at a point on a ray intersection interval;
 determining, in the processor, whether the point is inside the sphere region;
 discarding, in the processor, pixels of the ray intersection interval that are inside the sphere region;
 evaluating, in the processor, an implicit function of a cone region and a half-space region at the point in response to determining the point is not inside the sphere region;
 determining, in the processor, whether the point is inside the cone region and half-space region;
 discarding, in the processor, pixels of the ray intersection interval that are inside both the cone region and half-space region;
 computing and returning pixel shading values in the processor for the pixels of the ray intersection interval that are not inside both the cone region and half-space region; and
 displaying the pixels having shading and depth values.

6. A device, comprising:
 a display; and
 a processor connected to the display, wherein the processor is configured with processor executable instructions to perform operations comprising:
  applying a scaling transformation to elements of a data set defining a viewing location and a ellipsoidal solid to determine a cone region;
  computing a ray intersection interval with the cone region;
  determining whether the ray intersection interval intersects with the cone region;
  discarding pixels of the ray intersection interval that do not intersect with the cone region;
  applying appropriate shading and depth values to pixels of the ray intersection interval that do intersect with the cone region; and
  displaying the pixels having shading and depth values to visualize a portion of a region of obstruction created by the ellipsoidal solid on the display.

7. The device of claim 6, wherein the processor is configured with processor executable instructions such that applying appropriate shading and depth values to pixels of the ray intersection interval that do intersect with the cone region comprises:
 determining whether the start point of the ray is outside the cone region;
 applying appropriate shading and depth values to only pixels of an end point of the ray intersection interval in response to determining the start of the ray is not outside the cone region; and
 applying appropriate shading and depth values to both pixels of the start point and the end point of the ray intersection interval in response to determining the start of the ray is outside the cone region.

8. The device of claim 6, wherein the processor is configured with processor executable instructions such that applying appropriate shading and depth values to pixels of the ray intersection interval that do intersect with the cone region comprises:
 evaluating an implicit function of a half-space region at a point on the ray intersection interval;
 determining whether the point is outside the half-space region;
 discarding pixels of the ray intersection interval that are outside the half-space region; and
 computing and returning pixel shading values for the pixels of the ray intersection interval that are not outside the half-space region.

9. The device of claim 6, wherein the processor is configured with processor executable instructions such that applying appropriate shading and depth values to pixels of the ray intersection interval that do intersect with the cone region comprises:
 evaluating an implicit function of a half-space region at a point on the ray intersection interval;
 determining whether the point is outside the half-space region;
 discarding pixels of the ray intersection interval that are outside the half-space region;
 evaluating an implicit function of the view volume at the point in response to determining the point is not outside the half-space region;
 determining whether the point is outside the view volume;
 discarding pixels of the ray intersection interval that are outside the view volume; and
 computing and returning pixel shading values for the pixels of the ray intersection interval that are not outside the view volume.

10. A device, comprising:
 a display; and
 a processor connected to the display, wherein the processor is configured with processor executable instructions to perform operations comprising:
  applying a scaling transformation to elements of a data set defining a viewing location and the ellipsoidal solid to determine a sphere region;
  evaluating an implicit function of the sphere region at a point on a ray intersection interval;
  determining whether the point is inside the sphere region;
  discarding pixels of the ray intersection interval that are inside the sphere region;
  evaluating an implicit function of a cone region and a half-space region at the point in response to determining the point is not inside the sphere region;
  determining whether the point is inside the cone region and half-space region;
  discarding pixels of the ray intersection interval that are inside both the cone region and half-space region;
  computing and returning pixel shading values for the pixels of the ray intersection interval that are not inside both the cone region and half-space region; and
  displaying, on the display, the pixels having shading and depth values to visualize an effect of the region of obstruction created by the ellipsoidal solid on a defined view volume.

11. A non-transitory processor readable medium having stored thereon processor executable instructions configured to cause a processor to perform operations comprising:
 applying a scaling transformation to elements of a data set defining a viewing location and a ellipsoidal solid to determine a cone region;
 computing a ray intersection interval with the cone region;
 determining whether the ray intersection interval intersects with the cone region;

discarding pixels of the ray intersection interval that do not intersect with the cone region;

applying appropriate shading and depth values to pixels of the ray intersection interval that do intersect with the cone region; and displaying the pixels having shading and depth values to visualize a portion of a region of obstruction created by the ellipsoidal solid.

12. The non-transitory processor readable medium of claim 11, wherein the stored processor executable instructions are configured to cause a processor to perform operations such that applying appropriate shading and depth values to pixels of the ray intersection interval that do intersect with the cone region comprises:

determining whether the start point of the ray is outside the cone region;

applying appropriate shading and depth values to only pixels of an end point of the ray intersection interval in response to determining the start of the ray is not outside the cone region; and applying appropriate shading and depth values to both pixels of the start point and the end point of the ray intersection interval in response to determining the start of the ray is outside the cone region.

13. The non-transitory processor readable medium of claim 11, wherein the stored processor executable instructions are configured to cause a processor to perform operations such that applying appropriate shading and depth values to pixels of the ray intersection interval that do intersect with the cone region comprises:

evaluating an implicit function of a half-space region at a point on the ray intersection interval;

determining whether the point is outside the half-space region;

discarding pixels of the ray intersection interval that are outside the half-space region; and computing and returning pixel shading values for the pixels of the ray intersection interval that are not outside the half-space region.

14. The non-transitory processor readable medium of claim 11, wherein the stored processor executable instructions are configured to cause a processor to perform operations such that applying appropriate shading and depth values to pixels of the ray intersection interval that do intersect with the cone region comprises:

evaluating an implicit function of a half-space region at a point on the ray intersection interval;

determining whether the point is outside the half-space region;

discarding pixels of the ray intersection interval that are outside the half-space region;

evaluating an implicit function of the view volume at the point in response to determining the point is not outside the half-space region;

determining whether the point is outside the view volume;

discarding pixels of the ray intersection interval that are outside the view volume; and computing and returning pixel shading values for the pixels of the ray intersection interval that are not outside the view volume.

15. A non-transitory processor readable medium having stored thereon processor executable instructions configured to cause a processor to perform operations comprising:

applying a scaling transformation to elements of a data set defining a viewing location and the ellipsoidal solid to determine a sphere region;

evaluating an implicit function of the sphere region at a point on a ray intersection interval;

determining whether the point is inside the sphere region;

discarding pixels of the ray intersection interval that are inside the sphere region;

evaluating an implicit function of a cone region and a half-space region at the point in response to determining the point is not inside the sphere region;

determining whether the point is inside the cone region and half-space region;

discarding pixels of the ray intersection interval that are inside both the cone region and half-space region;

computing and returning pixel shading values for the pixels of the ray intersection interval that are not inside both the cone region and half-space region; and displaying the pixels having shading and depth values to visualize an effect of the region of obstruction created by the ellipsoidal solid on a defined view volume.

* * * * *